United States Patent
Blase et al.

(10) Patent No.: US 9,696,416 B2
(45) Date of Patent: Jul. 4, 2017

(54) MOBILE RADAR SYSTEM

(71) Applicants: Guy E. Blase, St. Louis, MO (US); Donald A. LaPoint, St. Louis, MO (US)

(72) Inventors: Guy E. Blase, St. Louis, MO (US); Donald A. LaPoint, St. Louis, MO (US)

(*) Notice: Subject to any disclaimer, the term of this patent is extended or adjusted under 35 U.S.C. 154(b) by 633 days.

(21) Appl. No.: 14/209,715

(22) Filed: Mar. 13, 2014

(65) Prior Publication Data

US 2014/0266887 A1    Sep. 18, 2014

Related U.S. Application Data

(60) Provisional application No. 61/789,973, filed on Mar. 15, 2013.

(51) Int. Cl.
| | |
|---|---|
| *G01S 13/42* | (2006.01) |
| *G01S 7/02* | (2006.01) |
| *H01Q 1/18* | (2006.01) |
| *H01Q 3/08* | (2006.01) |
| *H01Q 3/30* | (2006.01) |
| G01S 13/00 | (2006.01) |
| G01S 7/00 | (2006.01) |
| H01Q 1/00 | (2006.01) |
| H01Q 3/00 | (2006.01) |

(52) U.S. Cl.
CPC ............... *G01S 13/42* (2013.01); *G01S 7/02* (2013.01); *H01Q 1/18* (2013.01); *H01Q 3/08* (2013.01); *H01Q 3/30* (2013.01); *G01S 2007/027* (2013.01)

(58) Field of Classification Search
CPC .. H01Q 3/02; H01Q 3/08; H01Q 1/12; H01Q 1/18; H01Q 3/26; H01Q 3/30; G01S 13/02; G01S 13/06; G01S 13/42; G01S 7/02; G01S 2007/027; G01S 13/422; F41G 7/00
See application file for complete search history.

(56) References Cited

U.S. PATENT DOCUMENTS

| | | | | |
|---|---|---|---|---|
| 2,572,733 | A | | 10/1951 | Konet |
| 2,707,400 | A | * | 5/1955 | Manger ................ G01S 13/422 33/316 |
| 2,879,502 | A | * | 3/1959 | Miller ..................... F41G 7/00 114/20.1 |
| 3,893,123 | A | * | 7/1975 | Bieser ..................... H01Q 1/18 343/706 |
| 4,433,337 | A | * | 2/1984 | Smith ..................... H01Q 1/18 343/709 |

(Continued)

*Primary Examiner* — Bernarr Gregory
(74) *Attorney, Agent, or Firm* — Senniger Powers LLP

(57) ABSTRACT

A radar system that includes a gimbal and a platform secured to a frame through the gimbal is disclosed. The radar system includes an antenna rotatably supported by the platform for rotation about an axis and configured to scan a hemispherical field of view above the platform. A controller that controls the rotation of the antenna and a gyroscopic stabilizer that is secured to the platform to maintain the platform in a stable and level position during operation of the radar system and rotation of the antenna is also disclosed. A vehicle is also disclosed for traversing a geographic region with the radar system. The antenna may transmit in the X band. A telescoping mast having a first end secured to the platform and having a second end secured to the gimbal is also disclosed.

20 Claims, 3 Drawing Sheets

(56) References Cited

U.S. PATENT DOCUMENTS

| | | | | |
|---|---|---|---|---|
| 4,442,435 A | * | 4/1984 | Kiryu | H01Q 1/18 33/321 |
| 5,202,695 A | * | 4/1993 | Hollandsworth | H01Q 1/18 244/3.16 |
| 5,922,039 A | * | 7/1999 | Welch | H01Q 1/18 280/5.507 |
| 6,111,542 A | | 8/2000 | Day et al. | |
| 7,940,206 B2 | | 5/2011 | Nohara et al. | |

* cited by examiner

MOBILE RADAR SYSTEM

CROSS-REFERENCE TO RELATED APPLICATIONS

This application is a nonprovisional patent application which claims the benefit of U.S. Provisional Patent Application Ser. No. 61/789,973 filed Mar. 15, 2013, the entire disclosure of which is incorporated by reference.

FIELD OF THE INVENTION

The present invention generally relates to mobile radar systems.

BACKGROUND OF THE INVENTION

The underlying principles for radar are well known. An antenna transmits a radio signal that strikes an object and reflects a signal back to the antenna. This return signal is then processed to determine the distance from the radar station to the object and the location of the object. In order to achieve good resolution and reliable images when transmitting a radar signal over tens of miles, the radar assembly should have a very stable mount. Stability becomes increasingly important with more sophisticated radar systems, such as those using the Doppler shift and phased array antennas.

Permanent radar installations are well known in the art. They are very large, heavy and have substantial foundations. Stability with such permanent radar installations is usually not an issue.

Portable radar installations used over considerable distances are also known in the art. These installations often use a mast to elevate the antenna above local obstructions and then further include stabilizing wires to hold the mast and antenna steady during use. While these systems are effective, it would be advantageous to have a less complex system that was easier to set up.

SUMMARY OF THE INVENTION

The present invention provides a mobile radar system.

In accordance with one aspect, there is provided a radar system that includes a gimbal and a platform secured to a frame through the gimbal. The radar system also includes an antenna rotatably supported by the platform for rotation about an axis and configured to scan a hemispherical field of view above the platform. A controller controls the rotation of the antenna. A gyroscopic stabilizer is secured to the platform to maintain the platform in a stable and level position during operation of the radar system and rotation of the antenna. The antenna may transmit in the X band. The controller may control the antenna to rotationally sequentially scan portions of the hemispherical space above the radar system to thereby provide a sequence of scans and wherein the controller includes a processor executing instructions for assembling the sequence of scans into a composite scan representing the scanned portions of the hemispherical space. A telescoping mast may have a first end secured to the platform and may have a second end secured to the gimbal, wherein the antenna is elevated relative to the frame in response to telescoping extension of the mast. The gyroscopic stabilizer may have a variable speed control.

In accordance with another aspect, there is provided a portable radar system for a geographic region. The radar system includes a vehicle for traversing the geographic region, a gimbal, a platform secured to the vehicle through the gimbal. The radar system also includes an antenna rotatably supported by the platform for rotation about an axis and configured to scan a hemispherical field of view above the vehicle. A controller controls the rotation of the antenna. A gyroscopic stabilizer is secured to the platform to maintain the platform in a stable and level position during operation of the radar system and rotation of the antenna. The antenna may transmit in the X band. The controller may control the antenna to rotationally sequentially scan portions of the hemispherical space above the radar system to thereby provide a sequence of scans and wherein the controller includes a processor executing instructions for assembling the sequence of scans into a composite scan representing the scanned portions of the hemispherical space. A telescoping mast may have a first end secured to the platform and may have a second end secured to the gimbal, wherein the antenna is elevated relative to the frame in response to telescoping extension of the mast. The gyroscopic stabilizer may have a variable speed control.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
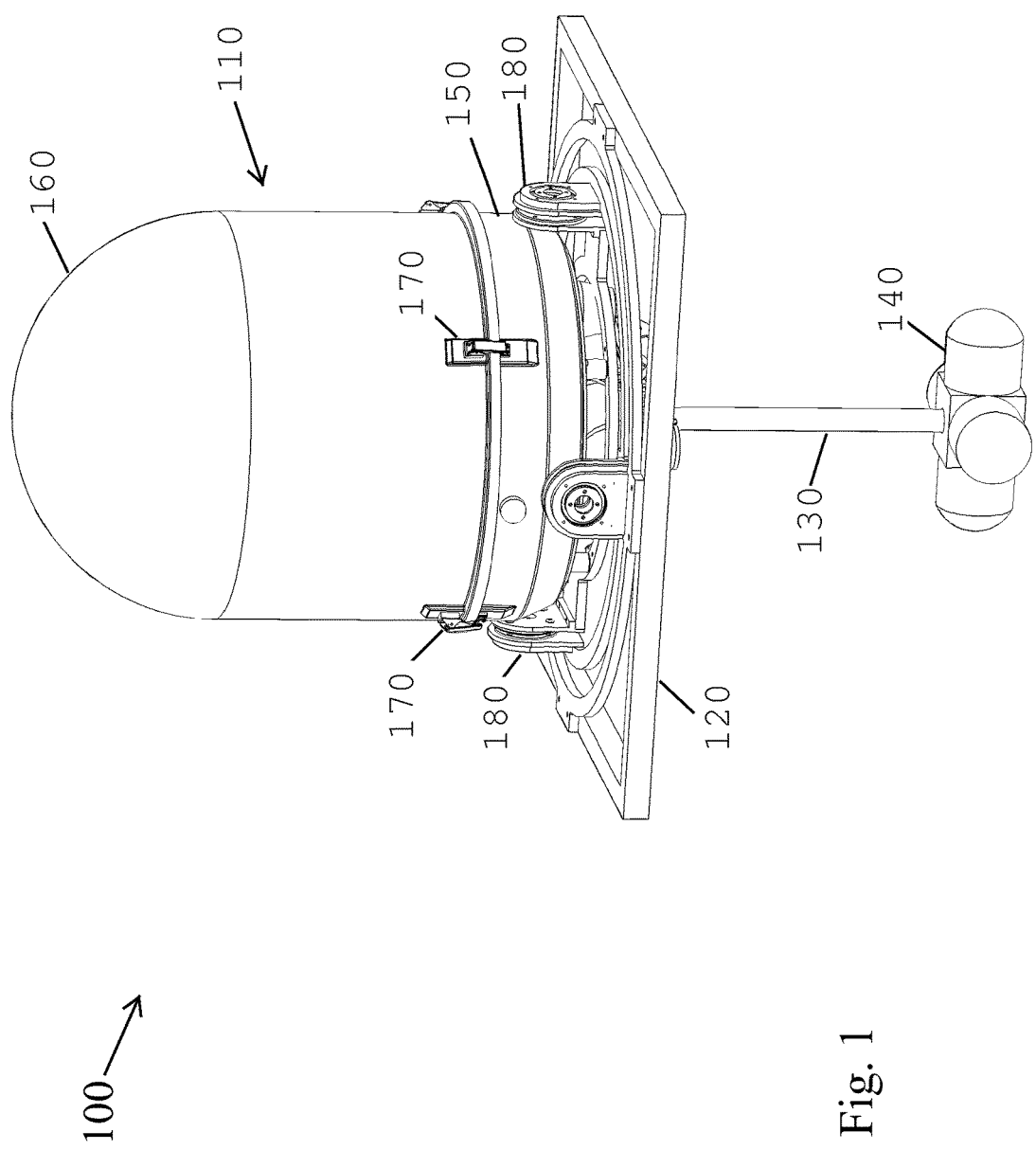
FIG. 1 shows a radar assembly gimbal mounted to a frame.

FIG. 1 is a perspective view showing a radar system 100. Radar system 100 includes a radar assembly 110, a frame 120, a gimbal 180 and a gyroscopic stabilizer 140. Radar assembly 110 includes a platform 150 at its base. Platform 150 rotatably supports an antenna (not shown in FIG. 1—shown in FIG. 3 at reference number 200) for rotation about an axis within radar dome 160. Radar dome 160 provides a protective cover over the antenna and is removably secured to the platform 150 with clasps 170. The antenna is configured to scan a hemispherical field of view above the platform 150. The platform 150 is thus secured to the frame 120 through the gimbal 180. The gyroscopic stabilizer 140 is secured to the platform 150 through extension 130 for stabilizing the platform 150 and radar assembly 110 during operation of the radar system 100.

Figure 2:
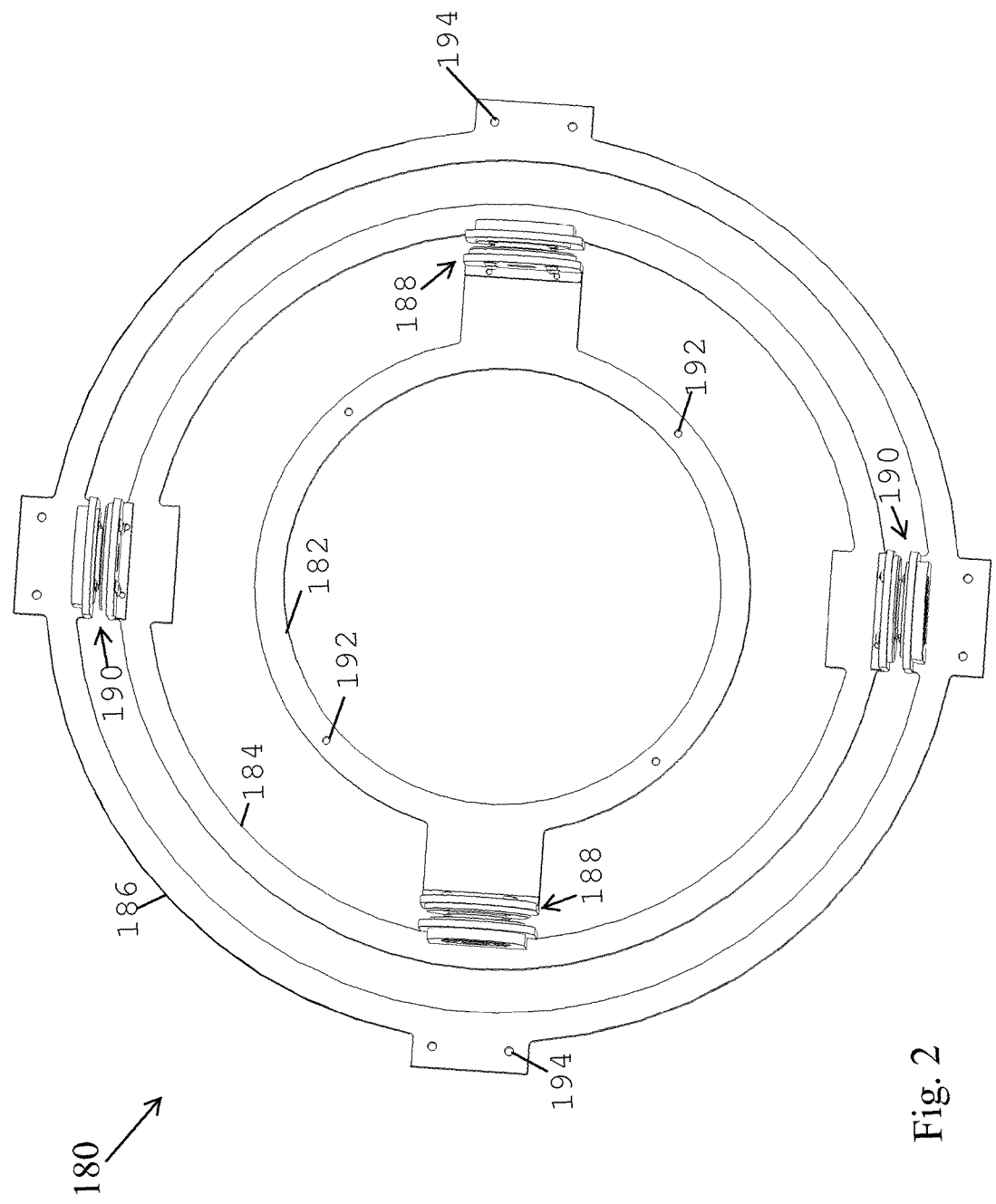
FIG. 2 shows a top down view of the gimbal.

FIG. 2 shows a top down view of the gimbal 180. Gimbal 180 includes a center ring 182, a middle ring 184, and an outer ring 186. The center ring 182 is pivotally connected to the middle ring 184 through pivots 188. The middle ring 184 is pivotally connected to the outer ring 186 through pivots 190. The platform 150 is secured to the center ring 182 through openings 192. The gimbal 180 is secured to the frame 120 through openings 194.

Figure 3:
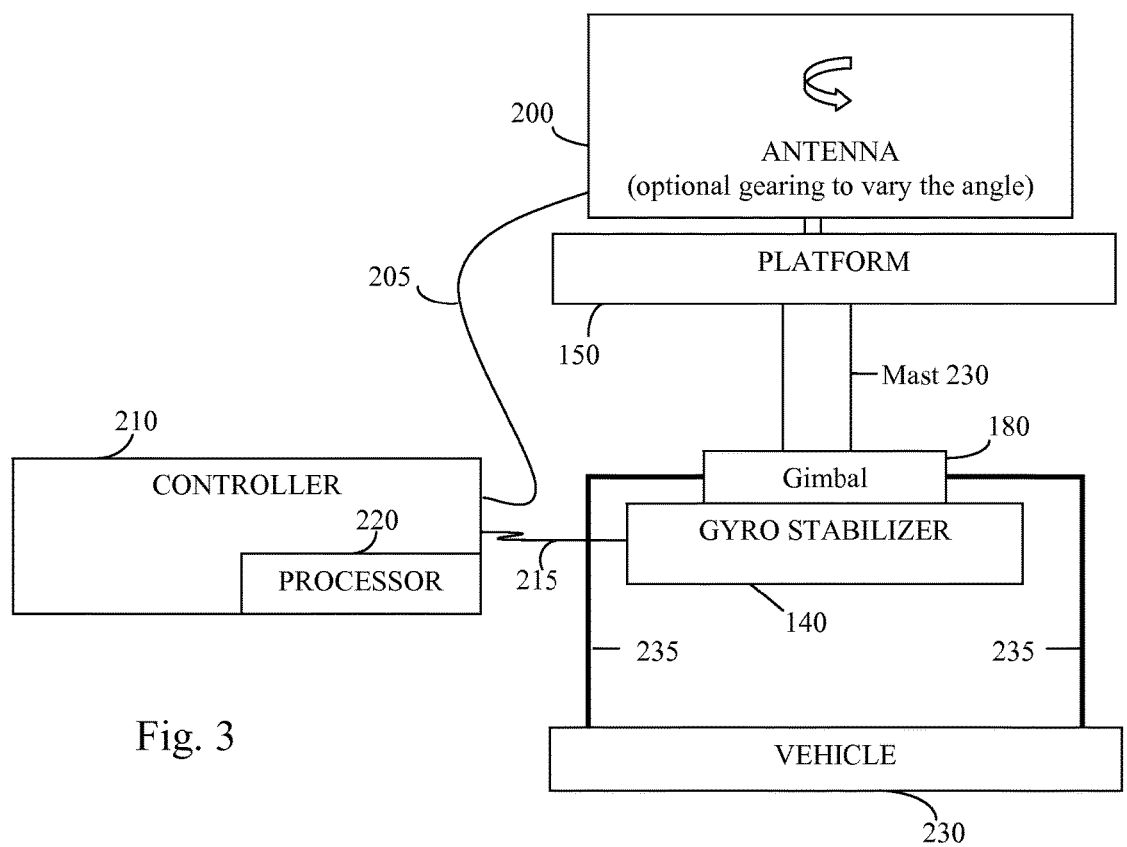
FIG. 3 shows a schematic diagram of a radar system.

FIG. 3 is a schematic diagram of the radar system 100. FIG. 3 shows a radar antenna 200 rotatably supported by the platform 150 for rotation about an axis and configured to scan a hemispherical field of view above the platform 150. A controller 210 is connected to a motor (not shown) that powers the rotation of the antenna 200. In this manner, controller 210 controls the rotation of the antenna 200 through a line 205. In some modes, the antenna 200 may rotate through a full 360 degrees under the control of controller 210. In other modes, antenna 200 may oscillate back and forth through an arc with endpoints defined by the controller 210. The gyroscopic stabilizer 140 is secured to the platform 150 to maintain the platform in a stable and level position during operation of the radar system 100 and rotational movement (whether 360 degrees or oscillatory) of the antenna 200. The antenna 200 can transmit any desired band of radiation. The X band has been found suitable for distances up to 100 miles from the radar station.

In use, the controller 210 controls the antenna 200 to rotationally sequentially scan portions of the hemispherical space above the radar system 100 to thereby provide a sequence of scans. The controller 210 includes a processor 220 that executes instructions for assembling the sequence of scans into a composite scan representing the scanned portions of the hemispherical space.

When the antenna 200 is of conventional design, it may be supported by gearing for varying the angle of the antenna 200 relative to the horizon as a function of a location of the scanned portion. This allows the antenna 200 to controllably direct the radar beam at the scanned portion. The controller 210 thus controls the gearing to control the angular position of the antenna 200 relative to the horizon to scan portions of hemispherical space.

When the antenna 200 is a phased array antenna, then the gearing described above for a conventional antenna design is not needed. Rather, the controller 210 controls the physical rotation of the antenna 200 such that a field of illumination of the antenna 200 sequentially scans a plurality of sectors. During the scanning of each sector by the antenna 150, the controller 210 varies the phase of the phased array of the antenna 150 to electronically scan the phased array within each sector being sequentially scanned simultaneously as the controller 210 physically rotates the antenna 200.

If the terrain adjacent to the radar system 100 obstructs the radar beam, an optional telescoping mast 230 can be used. Mast 230 has a first end secured to the platform 150 and has a second end secured to the gimbal. The antenna 200 is thus elevated relative to the frame 120 in response to telescoping extension of the mast 230.

The gyroscopic stabilizer 140 can include a variable speed gyroscope where the gyroscope spins at a higher rotational speed during selected operation of the radar system 200. Controller 210 controls the spin rate of the gyroscope through a line 215. For conditions where additional stability is needed, an increased spin rate can be used. For example, when the mast 230 is used and the antenna 200 is elevated, the gyroscopic stabilizer may be operated at a higher spin rate. Wind conditions may also suggest a higher spin rate. In this manner, the gyroscopic stabilizer 140 controllably spins at a higher rotational speed to substantially stabilize the platform 150. A weight (not shown) secured below the platform 150 can also be positioned to contribute to the stability of the platform 150.

For uses where it is desired to move the radar system 100 quickly from one location to another over a geographic region, the radar system 100 can be mounted on a vehicle 230 through attachment of the gimbal 180 to the frame 235 of the vehicle 230. In this manner, the platform 150 is secured to the frame 235 through the gimbal 180. The frame 235 in FIG. 3 is thus seen to correspond to the frame 120 in FIG. 1. The radar system 100 is thus stabilized by the gyroscopic stabilizer 140 in the same manner set forth above. When the geographic region comprises land, the vehicle 230 can take the form of a common pickup truck or all-terrain vehicle. When the geographic region comprises a body of water, the vehicle 230 can take the form of a suitable boat or ship.

Having provided this detailed description, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above systems without departing from the scope of the invention, it is intended that all matter contained in the above description and shown in the accompanying drawings shall be interpreted as illustrative and not in a limiting sense.

What is claimed is:

1. A radar system comprising:
   a frame;
   a platform;
   a gimbal secured to the frame and pivotally supporting the platform;
   an antenna rotatably supported by the platform for rotation about an axis and configured to scan a hemispherical field of view above the platform;
   a controller for controlling the rotation of the antenna;
   a gyroscopic stabilizer secured to the platform to maintain the platform in a stable and level position during operation of the radar system and rotation of the antenna;
   wherein the gyroscopic stabilizer comprises a variable speed gyro and wherein the gyro controllably spins at a rotational speed to substantially stabilize the platform.

2. The radar system of claim 1 wherein the antenna transmits X band radar.

3. The radar system of claim 1 wherein the controller controls the antenna to rotationally sequentially scan portions of the hemispherical space above the radar system to thereby provide a sequence of scans and wherein the controller includes a processor executing instructions for assembling the sequence of scans into a composite scan representing the scanned portions of the hemispherical space.

4. The radar system of claim 3 further comprising gearing for varying an angle of the antenna relative to the horizon as a function of a location of the scanned portion and wherein the controller controls the gearing to control the angular position of the antenna relative to the horizon to scan portions of hemispherical space.

5. The radar system of claim 3 wherein the antenna comprises a phased array antenna, wherein the controller physically rotates the antenna such that a field of illumination of the antenna sequentially scans a plurality of sectors, and wherein, during the scanning of each sector by the antenna, the controller varies the phase of the phased array of the antenna to electronically scan the phased array within each sector being sequentially scanned simultaneously as the controller physically rotates the antenna.

6. The radar system of claim 1 further comprising a telescoping mast having a first end secured to the platform and having a second end secured to the gimbal, wherein the antenna is elevated relative to the frame in response to telescoping extension of the mast.

7. The radar system of claim 6 wherein the gyro spins at a first rotational speed during operation of the radar system with the antenna elevated, wherein the gyro spins at a second rotational speed during operation of the radar system with the antenna not elevated, and wherein the first rotational speed is greater than the second rotational speed.

8. The radar system of claim 1 further comprising a weight secured below the platform, wherein the weight is positioned to contribute to the stability of the platform.

9. A portable radar system for a geographic region comprising:
   a vehicle for traversing the geographic region;
   a platform;
   a gimbal secured to the vehicle and pivotally supporting the platform;
   an antenna rotatably supported by the platform for rotation about an axis and configured to scan a hemispherical field of view above the vehicle;
   a controller for controlling the rotation of the antenna;
   a gyroscopic stabilizer secured to the platform to maintain the platform in a stable and level position during operation of the radar system and rotation of the antenna;
   wherein the gyroscopic stabilizer comprises a variable speed gyro and wherein the gyro controllably spins at a rotational speed to substantially stabilize the platform.

10. The radar system of claim 9 wherein the antenna transmits X band radar.

11. The radar system of claim 9 wherein the controller controls the antenna to rotationally sequentially scan portions of the hemispherical space above the radar system to thereby provide a sequence of scans and wherein the controller includes a processor executing instructions for assembling the sequence of scans into a composite scan representing the scanned portions of the hemispherical space.

12. The radar system of claim 11 further comprising gearing for varying an angle of the antenna relative to the horizon as a function of a location of the scanned portion and wherein the controller controls the gearing to control the angular position of the antenna relative to the horizon to scan portions of hemispherical space.

13. The radar system of claim 11 wherein the antenna comprises a phased array antenna, wherein the controller physically rotates the antenna such that a field of illumination of the antenna sequentially scans a plurality of sectors, and wherein, during the scanning of each sector by the antenna, the controller varies the phase of the phased array of the antenna to electronically scan the phased array within each sector being sequentially scanned simultaneously as the controller physically rotates the antenna.

14. The radar system of claim 9 further comprising a telescoping mast having a first end secured to the platform and having a second end secured to the gimbal, wherein the antenna is elevated relative to the vehicle in response to telescoping extension of the mast.

15. The radar system of claim 14 wherein the gyro spins at a first rotational speed during operation of the radar system with the antenna elevated, and wherein the gyro spins at a second rotational speed during operation of the radar system with the antenna not elevated, wherein the first rotational speed is greater than the second rotational speed.

16. The radar system of claim 9 further comprising a weight secured below the platform, wherein the weight is positioned to contribute to the stability of the platform.

17. A radar system comprising:
   a frame;
   a platform;
   a gimbal secured to the frame and pivotally supporting the platform;
   an antenna rotatably supported by the platform for rotation about an axis and configured to scan a hemispherical field of view above the platform;
   a controller for controlling the rotation of the antenna;
   a gyroscopic stabilizer secured to the platform to maintain the platform in a stable and level position during operation of the radar system and rotation of the antenna;
   wherein the controller controls the antenna to rotationally sequentially scan portions of the hemispherical space above the radar system to thereby provide a sequence of scans and wherein the controller includes a processor executing instructions for assembling the sequence of scans into a composite scan representing the scanned portions of the hemispherical space; and
   wherein the antenna comprises a phased array antenna, wherein the controller physically rotates the antenna such that a field of illumination of the antenna sequentially scans a plurality of sectors, and wherein, during the scanning of each sector by the antenna, the controller varies the phase of the phased array of the antenna to electronically scan the phased array within each sector being sequentially scanned simultaneously as the controller physically rotates the antenna.

18. The radar system of claim 17 wherein the gyroscopic stabilizer comprises a variable speed gyro and wherein the gyro controllably spins at a rotational speed to substantially stabilize the platform.

19. A radar system comprising:
   a frame;
   a platform;
   a gimbal secured to the frame and pivotally supporting the platform;
   an antenna rotatably supported by the platform for rotation about an axis and configured to scan a hemispherical field of view above the platform;
   a controller for controlling the rotation of the antenna;
   a gyroscopic stabilizer secured to the platform to maintain the platform in a stable and level position during operation of the radar system and rotation of the antenna;
   a telescoping mast having a first end secured to the platform and having a second end secured to the gimbal, wherein the antenna is elevated relative to the frame in response to telescoping extension of the mast; and
   wherein the gyroscopic stabilizer comprises a variable speed gyro, wherein the gyro spins at a first rotational speed during operation of the radar system with the antenna elevated wherein the gyro spins at a second rotational speed during operation of the radar system with the antenna not elevated, and wherein the first rotational speed is greater than the second rotational speed.

20. The radar system of claim 19 wherein the gyro controllably spins at a rotational speed to substantially stabilize the platform.

* * * * *